3,346,570
PROCESS FOR THE ISOLATION OF 7α-METHYL-STEROIDS FROM MIXTURES OF THE EPIMERIC 7-METHYL COMPOUNDS

Georg Anner, Basel, and Peter Wieland, Oberwil, Basel-Land, Switzerland, assignors to Ciba Corporation, New York, N.Y., a corporation of Delaware
No Drawing. Filed Feb. 1, 1966, Ser. No. 523,890
Claims priority, application Switzerland, Feb. 15, 1965, 1,994/65
10 Claims. (Cl. 260—239.55)

The present invention provides a process for isolating 7α-methyl-3-oxo-$\Delta^4$-steroids from mixtures of the epimeric 7-methyl compounds.

It is known that when methyl magnesium bromide is added on to the 1,6-position of a $\Delta^{4,6}$-3-ketone, a mixture of 7α- and 7β-methyl-3-oxo-$\Delta^4$-steroids is obtained. By chromatography part of the individual epimers can be obtained in the pure form in certain cases, but in all cases a mixture is left that can practically not be resolved by conventional purifying or separating methods, such as chromatography or crystallization. According to one proposal for resolving this mixture it was dehydrogenated with chloranil. The mixture treated in this manner can then be separated by chromatography. It is a considerable disadvantage of this method that it can be applied only to 7-methyl-3-oxo-$\Delta^4$-steroids whose molecule is free from substituents that are changed by acids, for example acetal, hemiacetal or ketal groupings. It is also known that quinones are capable of dehydrogenating 3-oxo-$\Delta^4$-steroids not only in the 6,7 but also in the 1,2-position and that this 1,2-dehydrogenation is not inhibited by a substituent present in position 7. In the aforementioned process, however, the 6,7-dehydrogenation which affects only the 7β-methyl compounds is accompanied by dehydrogenation in position 1,2 which affects also part of the 7α-methyl compounds present.

The present invention is based on the unexpected observation that the 7α-epimers are accessible from the said mixtures in a simple manner and with avoidance of the disadvantages mentioned when a mixture of epimeric 7-methyl-3-oxo-$\Delta^4$-steroids is treated with potassium cyanide and from the reaction mixture the 7α-methylepimer is isolated in a known manner.

As starting materials there are used the mixtures of epimeric 7-methyl-3-oxo-$\Delta^4$-steroids which may contain further substituents, for example, in position 11, 12, 16 and/or 17, such as methyl groups, or free, esterified or etherified hydroxyl groups, or free or protected oxo groups, or halogen atoms, and which may belong to the androstene, oestrene, pregnene, 19-nor-pregnene, cholestene or spirostene series. Preferred use is made of steroid mixtures of the general formulae

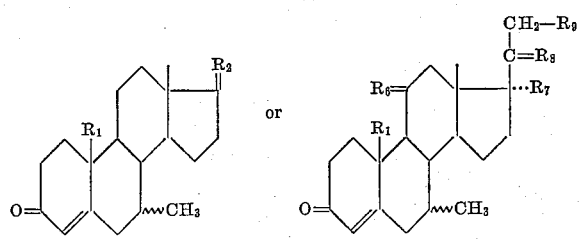

in which formulae $R_1$ represents hydrogen or methyl, $R_2$ stands for oxo, lower alkylenedioxy-, preferably, ethylenedioxy-, hydroxy together with a hydrogen atom or a lower alkyl, lower alkenyl or lower alkinyl radical or acyloxy together with a hydrogen atom, the acyl radical being derived from a carboxylic acid having 1 to 15 carbon atoms, $R_6$ represents an oxo group a hydroxy group together with a hydrogen atom or two hydrogen atoms, each of $R_7$ and $R_9$ stands for hydrogen, hydroxy or acyloxy, acyl having the significance given above, and $R_8$ represents an oxo or a lower alkylenedioxy group.

The acid radical of the above acyloxy groups are especially those of aliphatic, cycloaliphatic, araliphatic aromatic or heterocyclic carboxylic acids containing 1 to 15 carbon atoms, in the first place those of lower alkanoic acids. Such acyloxy groups are for example, the formates, acetates, propionates, butyrates, trimethylacetates, caproates, valerates, decanoates, cyclopentyl-propionates, tetrahydrobenzoates, phenylpropionates, benzoates, furoates, trifluoroates ethylcarbonates, methylcarbonates or the like. In the first place there are used mixtures of 7-methyl-3-oxo-$\Delta^4$-androstenes that contain in position 17 a ketalized oxo group, such as an ethylenedioxy group, 7-methyl-3-oxo-$\Delta^4$-pregnenes that contain in position 20 a ketalized oxo group and possibly in position 17 and/or 21 a protected hydroxyl group, such as the 20-ethylenedioxy group or the 17,20;20,21-bis-methylene-dioxy-group, 3-oxo-7,17α-dimethyl-17β-hydroxy-$\Delta^4$-estrene, or an ester of ether thereof, or 3-oxo-7-methyl-17β-hydroxy-$\Delta^4$-androstene or an ester or ether thereof.

The additive reaction with potassium cyanide according to this invention is carried out in the usual manner, using the reactants in the form of solutions or fine suspensions, e.g. in an alcohol such as methanol or ethanol or in an aqueous mixture thereof, and stirring them, preferably at room temperature or with cooling. Under these conditions the addition of the nitrile group on to the $\Delta^4$- double bond takes place only with the 7β-methylepimers. The mixture obtained in this manner is then easy to separate by chromatography and/or crystallization.

According to a preferred variant of the present process the starting material used is a mixture obtained by reacting 3-oxo-17-ethylenedioxy - $\Delta^{4,6}$ - androstene with methyl magnesium bromide and a copper salt, more especially cupric acetate or cuprous chloride, and after a first separation of the resulting 7α- and 7β-methylepimers on alumina by means of mixtures of benzene and petroleum ether.

The following examples illustrate the invention.

Example 1

A mixture of 25 mg. of 3-oxo-7β-methyl-17-ethylenedioxy-$\Delta^4$-androstene, 75 mg. of 3-oxo-7α-methyl-17-ethylenedioxy-$\Delta^4$-androstene, 50 mg. of potassium cyanide and 5 ml. of rectified alcohol is stirred for 34 hours at room temperature and then left to itself for 32 hours at $-5°$ C., then diluted with benzene, washed with water and with dilute sodium chloride solution, dried over sodium sulfate, and the organic solution is evaporated under vacuum. The residue is chromatographed on 3 g. of alumina (activity II) and eluted with a 1:4- and then a 1:1-mixture of benzene:petroleum ether, to yield 67 mg. of a 3-oxo-7α - methyl-17-ethylenedioxy-$\Delta^4$-androstene which melts at 110 to 112° C. after having been recrystallized from ether:pentane.

Example 2

While stirring a Grignard solution prepared from 24 g. of magnesium, 300 ml. of diethyl ether and methyl bromide under nitrogen and cooling with an ice+salt mixture, 600 ml. of anhydrous tetrahydrofuran are added, whereupon within about ½ hour, 4.8 g. of cuprous chloride are cautiously added in small portions. In the course of 30 minutes, at a temperature from $-10°$ to $-8°$ C. a solution of 32 g. of 3-oxo-17-ethylenedioxy-$\Delta^{4,6}$-androstadiene in 480 ml. of absolute tetrahydrofuran is dropped in, while flushing with 120 ml. of tetrahydrofuran. On completion of the addition the batch is stirred on for 1 hour at $-10°$ C., whereupon successively 300 ml. of saturated ammonium chloride solution, 150 ml. of water and 300 ml. of semi-saturated ammonium chloride solution are added. The contents of the flask is flushed with benzene into a separating funnel, and the aqueous phase is agitated with 2× 800 ml. of benzene. The organic extracts are washed with 3× 500 ml. of saturated ammonium chloride solution, dried and evaporated under vacuum. The residue is dissolved in a 1:4-mixture of benzene+petroleum ether and chromatographed on 30 times its own weight of alumina (activity II). The fractions eluted with 1:4- and 1:1-mixtures of benzene+petroleum ether are combined and recrystallized from a mixture of ether+pentane, to yield 13.81 g. of 3-oxo-7α-methyl-17-ethylenedioxy-Δ⁴-androstene melting at 107 to 111° C. Crystallization of the benzene fractions from a mixture of ether+pentane yields 3.4 g. of 3-oxo-7β-methyl-17-ethylenedioxy-Δ⁴-androstene melting at 136.5° to 140° C.

The resulting mother liquors (about 9.1 g.) are combined, mixed with 400 ml. of rectified alcohol and 4 g. of potassium cyanide and stirred for 42 hours at room temperature, then diluted with liter of 6% sodium chloride solution and extracted with 3× 800 ml. of benzene. The organic portions are washed with 2× 1 liter of 6% sodium chloride solution, dried and evaporated under vacuum. The residue (about 9.2 g.) is dissolved in a 1:4-mixture of benzene+petroleum ether and chromatographed on 270 g. of alumina (activity II). The fractions eluted with 1:4- and 1:1-mixtures of benzene+petroleum ether are evaporated and crystallized from an ether+pentane mixture, to yield further 4.56 g. of 3-oxo-7α-methyl-17-ethylenedioxy-Δ⁴-androstene melting at 112 to 113° C. Accordingly, the total yield of 7α-methyl compound amounts to about 57.5% by weight.

*Example 3*

A mixture of 100 mg. of 3-oxo-7β,17α-dimethyl-17β-hydroxy-Δ⁴-estrene, 100 mg. of 3-oxo-7α,17α-dimethyl-17β-hydroxy-Δ⁴-estrene, 200 mg. of potassium cyanide and 20 ml. of rectified alcohol is stirred for 18 hours at room temperature. The reaction solution is then poured into dilute sodium chloride solution and extracted three times with methylene-chloride. The organic solutions are combined, washed with dilute sodium chloride solution, dried and evaporated under vacuum. Chromatography of the resulting crude product on neutral alumina (activity II) yields on elution with a 1:1-mixture of benzene+petroleum ether and with benzene 90 mg. of crude 3-oxo-7α,17α-dimethyl-17β-hydroxy-Δ⁴-estrene which melts at 176 to 179° C. after having been recrystallized from methylene-chloride+ether.

What is claimed is:

1. A process for the isolation of 7α-methyl-3-oxo-Δ⁴-steroids from mixtures of the epimeric 7-methyl compounds, wherein a mixture of epimeric 7-methyl-3-oxo-Δ⁴-steroids is treated with potassium cyanide and from the reaction mixture the 7α-methyl-epimer is isolated.

2. A process as claimed in claim 1, wherein the reaction is carried out with potassium cyanide in an alcohol.

3. A process as claimed in claim 1, wherein the 7α-methyl-epimer is isolated by chromatography.

4. A process as claimed in claim 1, wherein the 7α-methyl-epimer is isolated by crystallization.

5. A process as claimed in claim 1, wherein a mixture of epimeric 7-methyl-3-oxo-Δ⁴-steroids belonging to the androstene, oestrene, pregnene, 19-nor-pregnene, cholestene or spirostene series, is used as starting material.

6. A process as claimed in claim 1, wherein a mixture of epimers of the formula

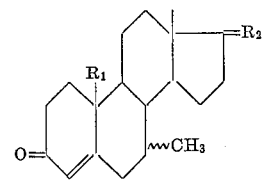

is used as starting material, in which formula $R_1$ represents a member selected from the group consisting of hydrogen or methyl and $R_2$ stands for a member selected from the group consisting of

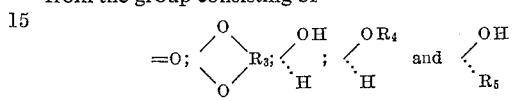

wherein $R_3$ represents a lower alkylene radical, $R_4$ stands for an aliphatic carbocyclic acid having 1 to 15 carbon atoms and $R_5$ stands for a member of the group consisting of lower alkyl, lower alkenyl and lower alkinyl.

7. A process as claimed in claim 1, wherein a mixture of epimeric 7-methyl-3-oxo-Δ⁴-androstenes, which contain in 17- position a lower alkylenedioxy radical, is used as starting material.

8. A process as claimed in claim 7, wherein a mixture of 7α- and 7β-methyl-3-oxo-17-ethylenedioxy-Δ⁴-androstene is used as starting material.

9. A process as claimed in claim 1, wherein a mixture of epimeric 3-oxo-7:17α-dimethyl-17β-hydroxy - Δ⁴ - oestrene, is used as starting material.

10. A process as claimed in claim 1, wherein a mixture of epimers of the formula

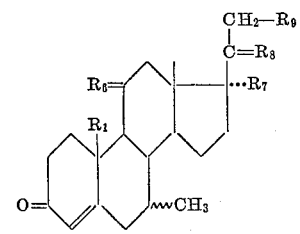

is used as starting material, in which $R_1$ stands for a member selected from the group consisting of hydrogen and methyl, $R_6$ represents a member selected from the group consisting of oxo, hydroxy together with a hydrogen atom and two hydrogen atoms, each of $R_7$ and $R_9$ stands for a member selected from the group consisting of hydrogen, hydroxy and acyloxy, acyl being the residue of a carboxylic acid having from 1 to 15 carbon atoms and $R_8$ represents a member selected from the group consisting of oxo and lower alkylenedioxy.

References Cited

UNITED STATES PATENTS 3,050,518   8/1962   Bowers et al. ____ 260—239.55

OTHER REFERENCES

Campbell et al.: J. Amer. Chem. Soc. 81, 4069–4074 (1959).

LEWIS GOTTS, *Primary Examiner.*

T. MESHBESHER, *Assistant Examiner.*